(12) United States Patent
Kay

(10) Patent No.: US 9,988,119 B1
(45) Date of Patent: Jun. 5, 2018

(54) PROTECTIVE COVER FOR SMALL LAND VEHICLES

(71) Applicant: Jonathan S Kay, Preston (GB)

(72) Inventor: Jonathan S Kay, Preston (GB)

(73) Assignee: Randy C. Mottram, Orange, CA (US)

( * ) Notice: Subject to any disclaimer, the term of this patent is extended or adjusted under 35 U.S.C. 154(b) by 142 days.

(21) Appl. No.: 14/859,662

(22) Filed: Sep. 21, 2015

(51) Int. Cl.
*B65D 85/68* (2006.01)
*B62J 19/00* (2006.01)

(52) U.S. Cl.
CPC ..................... *B62J 19/00* (2013.01)

(58) Field of Classification Search
CPC .. B62J 19/00; B62J 23/00; B62J 35/00; B60R 9/10; B25H 1/0007
USPC ......... 150/167; 206/335; 224/153, 183, 488, 224/576; 280/30; 296/102, 136.01, 296/136.02, 136.07, 98; D12/401–404, D12/423
See application file for complete search history.

(56) References Cited

U.S. PATENT DOCUMENTS

| | | | | |
|---|---|---|---|---|
| 2,311,514 A * | 2/1943 | Bramblett | ............... | B60J 11/00 150/166 |
| 3,474,803 A * | 10/1969 | Davis | ................... | E04H 6/04 135/124 |
| 4,693,289 A * | 9/1987 | Taylor | ................. | A61G 3/0209 150/166 |
| 4,827,997 A * | 5/1989 | Rolan | .................... | B32B 27/12 150/166 |
| 6,349,732 B1 * | 2/2002 | Cooper | ................. | E04H 6/005 135/116 |
| 9,578,952 B1 * | 2/2017 | Wray | ....................... | A45F 3/04 |
| 2006/0225822 A1 * | 10/2006 | Chen | ....................... | B60J 11/00 150/166 |
| 2014/0041773 A1 * | 2/2014 | Roberts | ................... | B62J 19/00 150/167 |
| 2016/0221427 A1 * | 8/2016 | Robinson | ................ | B60J 11/04 |
| 2017/0118926 A1 * | 5/2017 | Toye | ................. | A01G 13/0206 |

* cited by examiner

*Primary Examiner* — Fenn C Mathew
*Assistant Examiner* — Cynthia Collado

(57) ABSTRACT

A protective covers for small land vehicles has a bottom cover member that is generally in the form of a flat elongated rectangular thin material with two side edges and two end edges attached at a front end edge to a front end edge of a top cover member that has two side portions and two end portions generally in the form of a thin material to cover and drape over a small land vehicle that has handle bars. A peripheral edge of the bottom cover member has a first row of teeth for a zipper and a peripheral edge of the top cover member has a second row of teeth for the zipper. An outer layer of cover material is formed of 420 D water proof treated and UV treated material for the bottom cover member and the top cover member. A first inner layer of cover material is formed of 600 D-PVC material and is attached interior to the bottom cover member, and a second inner layer of cover material is formed of 600 D fabricated of 80 to 90 GSM material and is attached interior to the top cover member.

4 Claims, 4 Drawing Sheets

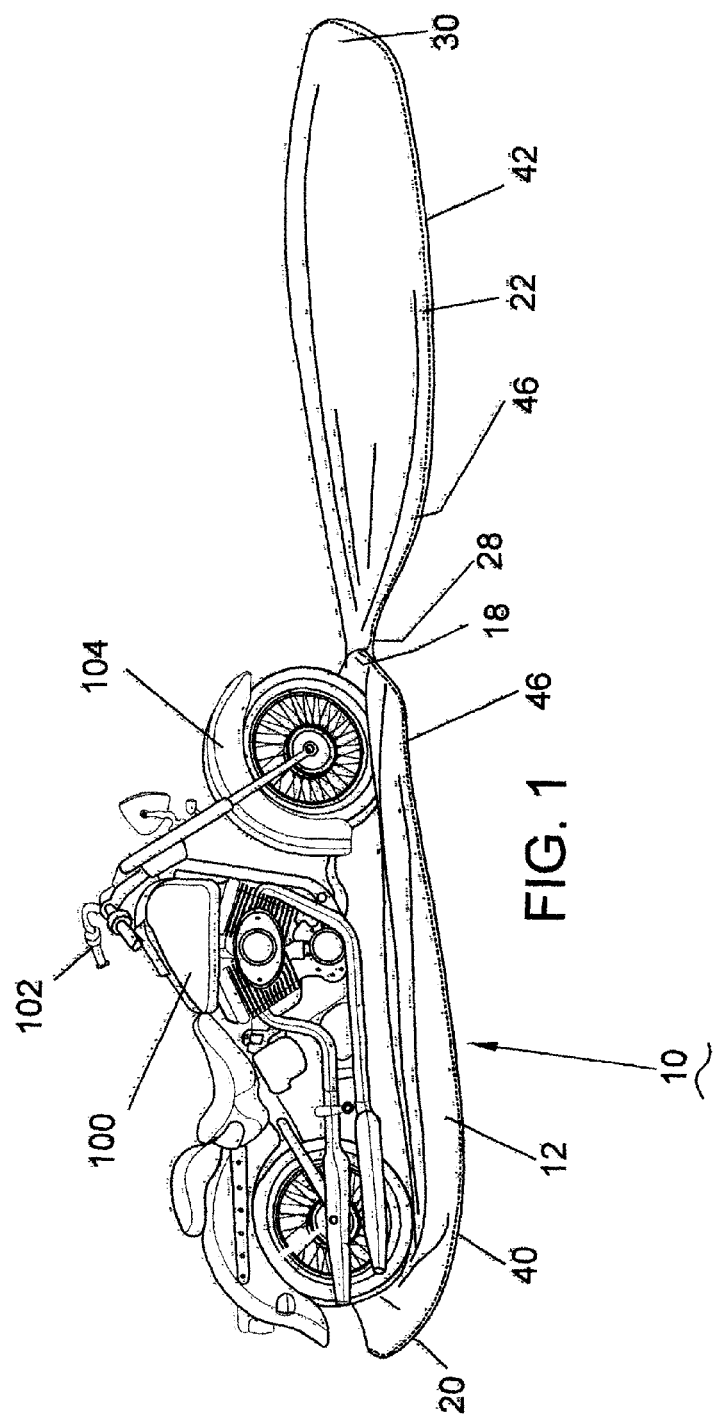

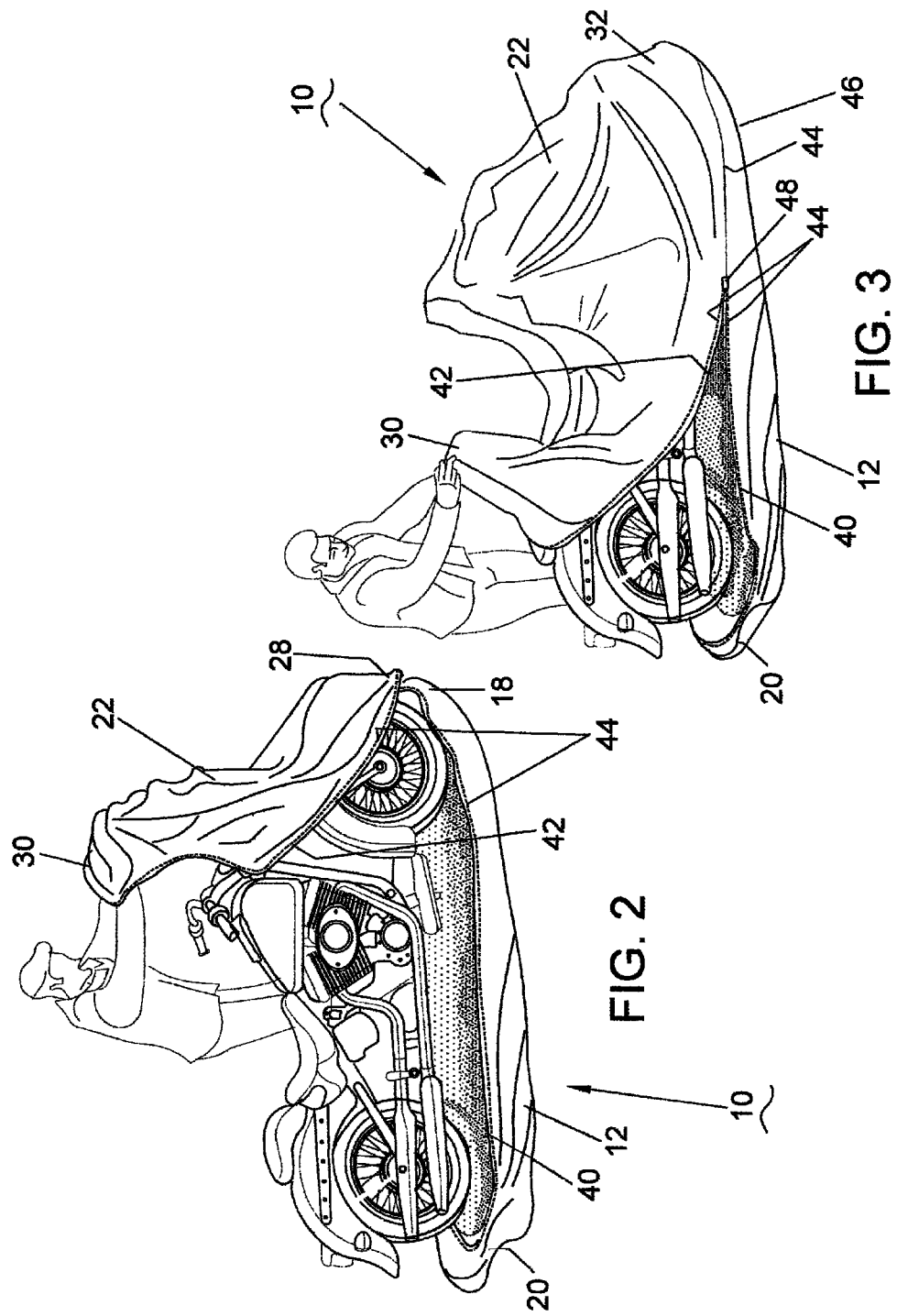

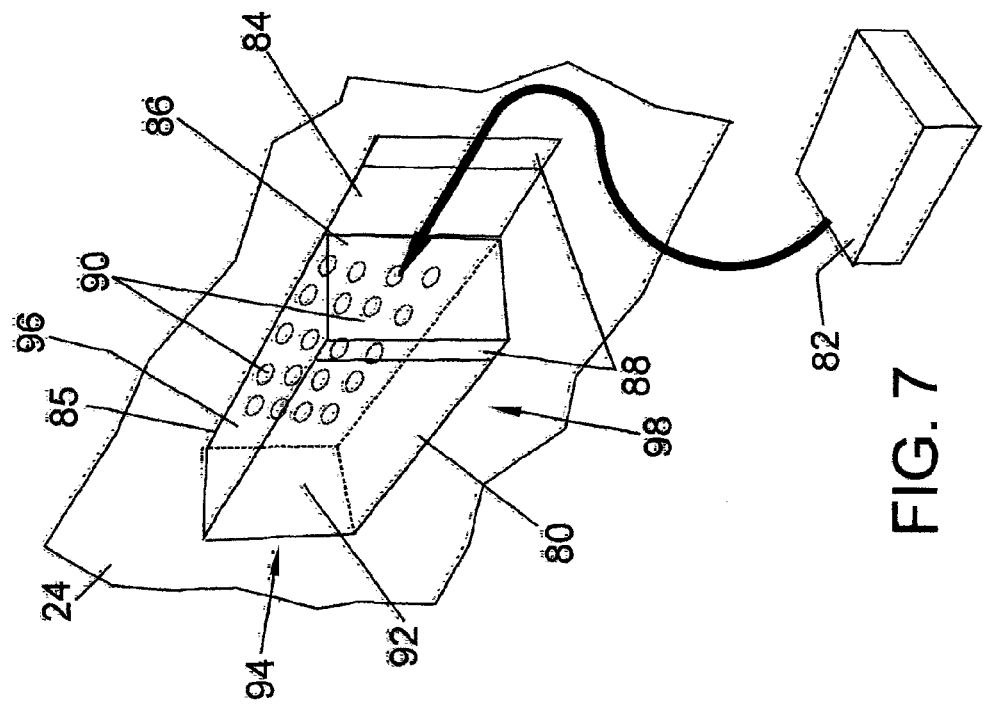
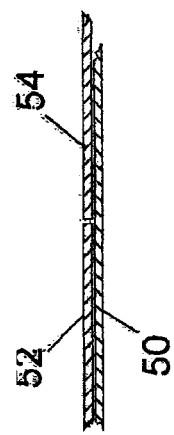
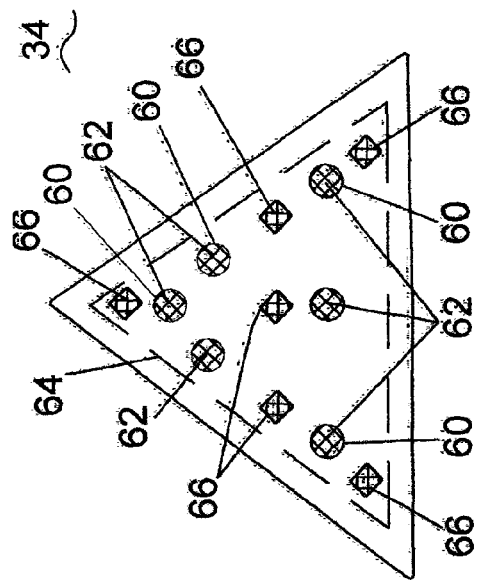

PROTECTIVE COVER FOR SMALL LAND VEHICLES

BACKGROUND OF THE INVENTION

This invention relates to covers for small land vehicles such as cycles that may be motorcycles, bicycles or other small land vehicles that may have handle bars. The new protective cover has a bottom cover member and top cover member attached end to end at edges, and a two layer material cover with closure means to exclude moisture, rain, dust and other environmental elements and to allow air entry with drying elements to reduce any moisture.

Covers for small land vehicles are known for protecting vehicles such as motorcycles, bicycles and the like. Many of these covers are designed to just drape or position over a vehicle with no protection under the vehicle. Other covers that may wrap around a cycle such as a bicycle are difficult to use and may not be usable with for example the motorcycles and all-terrain vehicles (ATV) that have handle bars.

There are also more complicated protective covers as for example U.S. Pat. No. 5,533,616 of Crowfoot and U.S. Pat. No. 5,921,389 of Zoffer. In the instance of the Crowfoot patent there is a very complicated rib structural system to support the top cover member of the protective cover. The rib structure requires rotation about the approximate center of a bottom or base cover member and attachment of one half of the top and bottom covers at peripheral edges for operation and closure of the cover. There are vent holes in the cover and sealing structure to provide water tight protection.

The Zoffer patent has a base platform for support of a cycle, a pair of side panels attached to the elongated sides of the base platform, and a pair of roof panels attached to the pair of side panels. Each combination side and roof panel is raised over a cycle to be draped on the cycle, which places the closure mechanism, for example, a zipper, on the cycle and may cause scratching or marring of the cycle paint and chrome.

There is a need for a simple protective cover that is easy to position around a cycle without complicated structure that is lightweight and foldable for ease of transport in a small package form, which is outdoor protective and has an inner layer of material for protecting a cycle surface, and which is protective for interior moisture that may exist.

SUMMARY OF THE INVENTION

The present invention is directed to protective covers for small land vehicles. A bottom cover member that is generally in the form of a flat elongated rectangular thin material with two side edges and two end edges is attached at a front end edge to a front end edge of a top cover member that has two side portions and two end portions generally in the form of a thin material to cover and drape over a small land vehicle that has handle bars. A peripheral edge of the bottom cover member has a first row of teeth for a zipper and a peripheral edge of the top cover member has a second row of teeth for the zipper. An outer layer of cover material is formed of 420 D water proof treated and UV treated material for the bottom cover member and the top cover member. A first inner layer of cover material is formed of 600 D-PVC material and is attached interior to the bottom cover member, and a second inner layer of cover material is formed of 600 D fabricated of 80 to 90 GSM material and is attached interior to the top cover member.

These and other features, aspects and advantages of the present invention will become better understood with reference to the following drawings, description and claims.

BRIEF DESCRIPTION OF THE DRAWINGS

FIG. 1 illustrates a side elevation view of a protective cover deployed for positioning a cycle thereon according to an embodiment of the invention;

FIG. 2 illustrates a side elevation view of a top cover member partially positioned over a front end and handle bars of a cycle according to an embodiment of the invention;

FIG. 3 illustrates a top cover member positioned over most of a cycle according to an embodiment of the invention;

FIG. 5 illustrates a partial side cross-section view of cover material layers according to an embodiment of the invention;

FIG. 6 illustrates a partial side view of a side portion of a top cover member with vent holes for positioning under handlebars according to an embodiment of the invention;

FIG. 7 illustrates a partial view of a side portion of a top cover with a pocket attached exterior to the top cover for receipt of a desiccant material according to an embodiment of the invention;

DETAILED DESCRIPTION

The following detailed description represents the best currently contemplated modes for carrying out the invention. The description is not to be taken in a limiting sense, but is made merely for the purpose of illustrating the general principles of the invention.

Figure 8:
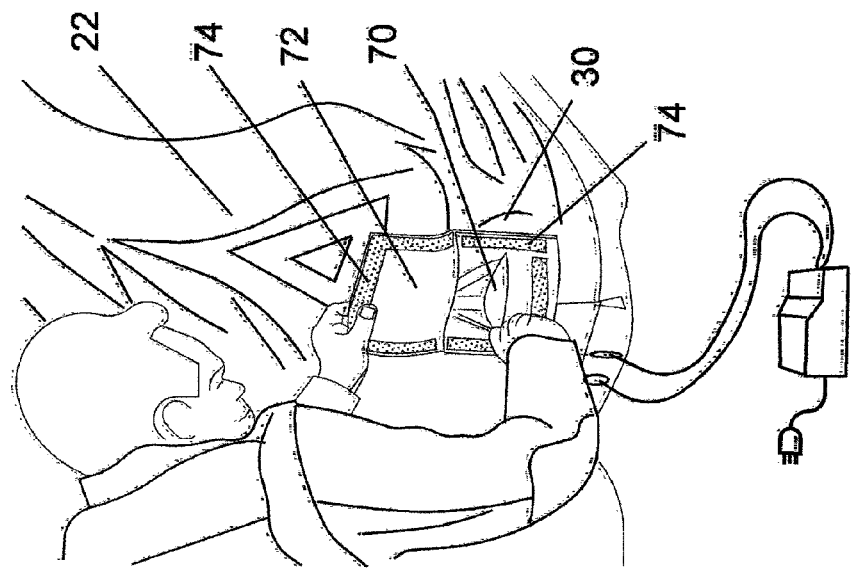
FIG. 8 illustrates a partial rear outside view of a back end portion of a protective cover with an access hole for cable connecting according to an embodiment of the invention.
Figure 4:
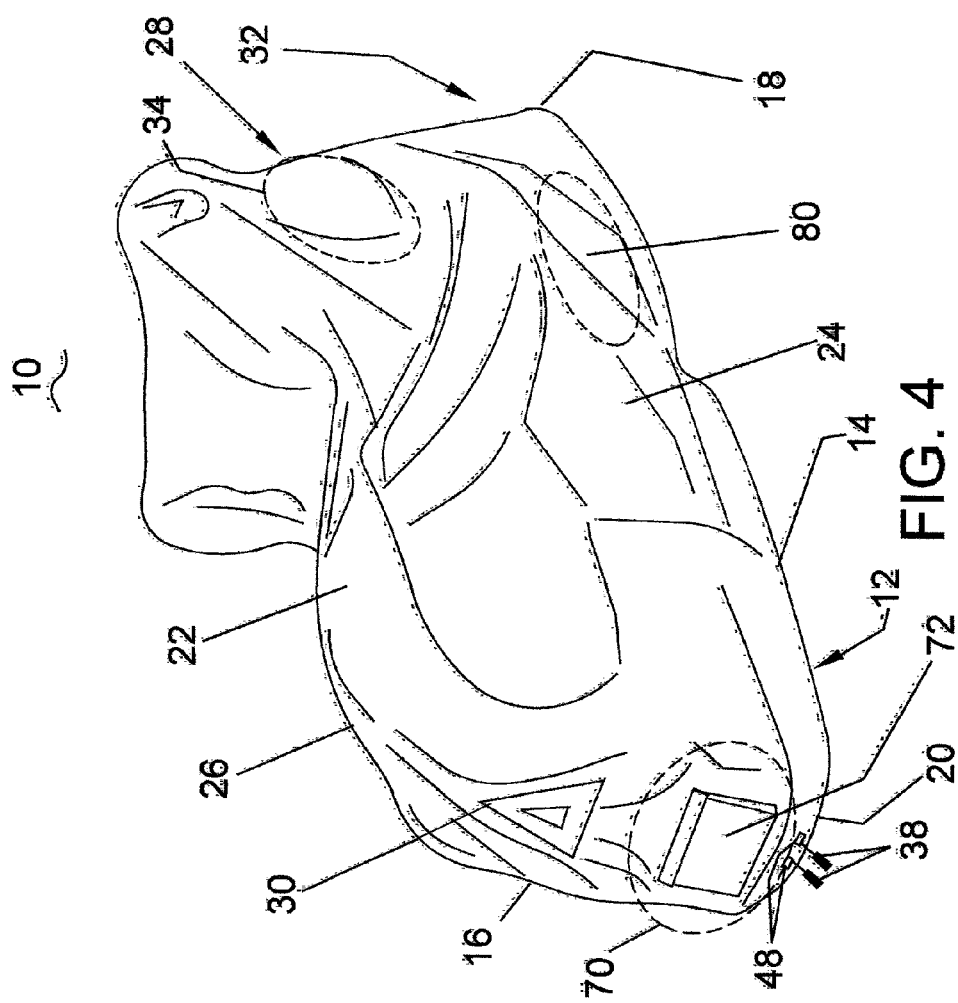
FIG. 4 illustrates a perspective view of a protective cover enclosing a cycle according to an embodiment of the invention.

Referring to FIGS. 1 through 4, a small land vehicle or cycle protective cover 10 has a floor or bottom cover member 12 that is generally an elongated rectangular shape with two sides 14, 16 and two ends 18, 20, and a top cover member 22 that is attached to one of the ends 18, 20. The top cover member 22 has an irregular form to fit over a cycle 100 to be draped on the cycle 100 when positioned for covering. The top cover member 22 has two generally side portions 24, 26 of cover material with cover extension 34 of cover material to cover protruding elements of the cycle 100, such as handle bars 102 as best illustrated in FIG. 4. The end portions 28, 30 of cover material are generally curved to fit the contours of the front and rear elements of the cycle 100. For purposes of this detail description the bottom cover member 12 and top cover member 22 are attached at respective ends 18 and 28 that is identified as the cover 10 front end 32 in the Figures. A cycle 100 front end 104 would be positioned on the bottom cover member 12 for purposes of covering and enclosing the cycle 100 in the protective cover 10.

The term cycle is used in this detailed description to mean any of the types of cycles such as motorcycle, bicycle, motor bicycle, and the like small land vehicles. This description is not meant to limit the type of small land vehicle that may be covered with the protective cover 10, for example, all-terrain vehicles or ATV's that may have handle bars 102.

The peripheral edge 40 of the bottom cover member 12 and the peripheral edge 42 of the top cover member 22 each have one of the two rows of teeth 46 for a zipper 44 for the sliding piece 48 for use to open and close the protective cover 10. The zipper 44 is a 10 gauge marine grade zipper to fully seal the bottom cover member 12 to the top cover member 22 for complete water resistance and dust protection for the contents of the protective cover 10. The zipper 44 may have pull tabs 38.

The bottom cover member 12 and top cover member 22 may be formed for an outside or outer layer 50 of cover material as two panels of material that are attached at front end 32 with stitching or fastening devices that are sealed for water resistance and dust, or the outer layer 50 may be formed as a one piece structure of cover material joined at the front end 32. The outer layer 50 of material is formed of 420 D water proof treated and UV treated material, such as 100 percent water proof PVC coated Nylon formulated material that is UV 30+ coated. Any stitching for necessary seems, for example at the front end 32, will use a needle point stitching method and seams will be covered with waterproof seam tape.

Inner layers 52, 54 of material are attached interior to the outer layer 50 of material. The inner layer 52 of material for the bottom cover member 12 is 600 D-PVC material and the inner layer 54 of material for the top cover member 22 is 600 D fabricated of 80-90 GSM material to protect a cycle 100 from scratches and wear of paint. The inner layer 54 is an 80-90 GSM Soft PP Cotton material that is heat resistant to 190 degrees Celsius. The letters "D" mean denier or thickness of the material, "GSM" mean the thickness of the material such as cotton in grams per square meter, and "PVC coating" is a layer of material applied to the cover material for waterproofing.

The top cover member 22 has vent holes 60 preferably positioned in the cover extensions 34 formed under the handle bars 102 of the cycle 100. The vent holes 60 have a mesh hole cover 62 that is tack stitched to the cover material to reduce susceptibility to wind and to also allow air into the protective cover 10. The mesh hole cover 62 acts as a filter to prevent dust from entering the protective cover 10. The vent holes 60 also allow release of moisture, but have an external flap 64 that is spot stitched 66 or otherwise fastened over the vent holes 60 to allow air to enter and to exclude entry of rain into the protective cover 10. Locating the vent holes 60 in the cover material under the handle bars 102 area also aids in this feature.

The protective cover 10 may have a pocket 80 positioned and attached on each side portion 24,26 for placement of desiccant material 82 in the pocket to reduce moisture content that may be in the protective cover 10. The side portions 24,26 may have holes 90 formed through the outer layer 50 and inner layer 22 for moisture penetration into a desiccant material 82 positioned in the pocket 80. The pocket 80 may have an open end 86 that may be closed by a flap 84 and a fastener 88. The fastener may be hook-and-loop material or other suitable fastener. The pocket 80 may be approximately 6 inches long by 4 inches high with a top wall 96, a bottom wall 98, an outside wall 92, and an end wall 94, see FIG. 7.

There may also be an access hole 70 formed in the top cover member 22 in the rear end portion 30 in an area that would be adjacent a cycle 100 rear tire when covered. The access hole 70 may be approximately 5 inches by 5 inches in size and is covered by a cover flap 72 that may be secured by a fastener 74 such as a hook-and-loop material. The access hole 70 may be used to connect electric charging cables to the cycle 100, to secure the cycle 100 to a stationary anchor for security, and the like.

The cover material for the protective cover 10 as described is light weight and flexible, and can be easily rolled for insertion in a bag for transport in a saddlebag for a cycle or in a backpack.

In use the protective cover 10 is positioned on a surface in a deployed or open position as illustrated in FIG. 1 with the bottom cover member 12 and top cover member 22 positioned end-to-end at the front end 32. A cycle 100, for example, a motorcycle, is driven onto or positioned on the bottom cover member 12 with the front end 104 and front wheel adjacent to the front end 32 of the protective cover 10. The top cover member 22 can then be manipulated to lift the cover over the front end 104 and the handle bars 102 to draw the cover to the rear end of the cycle 100 to drape the top cover member 22 on the cycle 10 to position the two rows of teeth 46 for the zipper 44 to be closed to enclose the cycle 100. To remove the cycle 100 the process would be reverse.

While the invention has been particularly shown and described with respect to the illustrated embodiments thereof, it will be understood by those skilled in the art that the foregoing and other changes in form and details may be made therein without departing from the spirit and scope of the invention.

I claim:

1. A protective cover for small land vehicles comprising:
   a bottom cover member that is generally in a form of a flat elongated rectangular thin material with two side edges and two end edges;
   a front end edge of said bottom cover member is attached to a front end edge of a top cover member that has two side portions and two end portions generally in a form of a thin material to cover and drape over a small land vehicle that has handle bars;
   a peripheral edge of said bottom cover member has a first row of teeth for a zipper and a peripheral edge of said top cover member has a second row of teeth for said zipper;
   an outer layer of cover material is formed of 420 D water proof treated and UV treated material for said bottom cover member and said top cover member; and
   a first inner layer of cover material is formed of 600 D-PVC material and is attached interior to said bottom cover member, and a second inner layer of cover material is formed of 600 D fabricated of 80 to 90 GSM material and is attached interior to said top cover member.

2. The protective cover as in claim 1 wherein:
   a plurality of vent apertures are formed in a cover extension of each of said two side portions;
   a mesh screen cover is disposed between said outer layer and said second inner layer positioned to filter air flow through said plurality of vent apertures; and
   a flap is loosely disposed over said plurality of vent apertures and spot stitched to said top cover member.

3. The protective cover as in claim 1 wherein:
   a pocket of generally rectangular shape with a top wall and a bottom wall, a first side wall and a first end wall, a second open side and a second open end that is closed by a flap;
   a plurality of apertures are formed in each of said two side portions;
   said pocket is disposed over each of said plurality of apertures and attached to each of said two side portions; and
   a desiccant material is disposed in each of said pockets abutting each of said plurality of apertures.

4. The protective cover as in claim 1 wherein a rear end portion of said two end portions has an aperture therein with a cover flap that is detachably attached over said aperture by a fastener.

\* \* \* \* \*